US008560994B1

(12) United States Patent
Agrawal et al.

(10) Patent No.: US 8,560,994 B1
(45) Date of Patent: Oct. 15, 2013

(54) ENABLING STATISTICAL TESTING USING DETERMINISTIC MULTI-CORNER TIMING ANALYSIS

(75) Inventors: Bhavna Agrawal, Armonk, NY (US);
David S. Kung, Chappaqua, NY (US);
Jinjun Xiong, White Plains, NY (US);
Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/454,795

(22) Filed: Apr. 24, 2012

(51) Int. Cl.
*G06F 17/50* (2006.01)
(52) U.S. Cl.
USPC ........... 716/113; 716/108; 716/132; 716/134; 716/136
(58) Field of Classification Search
USPC .......................... 716/108, 113, 132, 134, 136
See application file for complete search history.

(56) References Cited

U.S. PATENT DOCUMENTS

| | | | |
|---|---|---|---|
| 7,092,838 B1 * | 8/2006 | Srinivas et al. ............... | 702/117 |
| 7,401,307 B2 | 7/2008 | Foreman et al. | |
| 7,487,475 B1 | 2/2009 | Kriplani et al. | |
| 7,555,740 B2 | 6/2009 | Buck et al. | |
| 7,594,210 B2 | 9/2009 | Becer et al. | |
| 7,620,921 B2 | 11/2009 | Foreman et al. | |
| 7,716,616 B2 | 5/2010 | Foreman et al. | |
| 7,761,826 B1 * | 7/2010 | Thanvantri et al. ........... | 716/108 |
| 8,141,012 B2 * | 3/2012 | Buck et al. .................... | 716/104 |
| 2007/0277134 A1 | 11/2007 | Zhang et al. | |
| 2009/0249270 A1 | 10/2009 | Buck et al. | |
| 2009/0288051 A1 | 11/2009 | Hemmett et al. | |
| 2012/0117527 A1 * | 5/2012 | Hemmett et al. ............. | 716/113 |

FOREIGN PATENT DOCUMENTS

WO   WO 2006/009671 A2   1/2006

OTHER PUBLICATIONS

Visweswariah, Challenges in Robust Optimization of Digital Circuit Integrated Circuits, 2010, IBM System and Technology Group, pp. 1-41.*
Visweswariah et al. First-Order Parameterized Block-Based Statistical Timing Analysis, 2004, IBM, pp. 1-27.*
Jing-Jia Nian et al., "A Unified Multi-Corner Multi-Mode Static Timing Analysis Engine", IEEE, 2010, pp. 669-674.
Visweswariah, C., et al., 2004, IEEE DAC., "First-Order Incremental Block Based Statistical Timing Analysis".

* cited by examiner

*Primary Examiner* — Nghia Doan
(74) *Attorney, Agent, or Firm* — Preston Young

(57) ABSTRACT

In one embodiment, the invention is a method and apparatus for variation enabling statistical testing using deterministic multi-corner timing analysis. One embodiment of a method for obtaining statistical timing data for an integrated circuit chip includes obtaining deterministic multi-corner timing data for the integrated circuit chip and constructing the statistical timing data from the deterministic multi-corner timing data.

17 Claims, 5 Drawing Sheets

ENABLING STATISTICAL TESTING USING DETERMINISTIC MULTI-CORNER TIMING ANALYSIS

BACKGROUND OF THE INVENTION

The present invention relates generally to design automation, and relates more particularly to timing analysis for testing of integrated circuit (IC) chips.

When IC chips come off the manufacturing line, the chips are tested "at-speed" to ensure that they perform correctly (and to filter out chips that do not perform correctly). In particular, a set of paths is selected, and the set of paths is then tested for each chip in order to identify the chips in which one or more of the selected paths fail timing requirements. Parametric process variation delay defects that affect multiple cell and wire delays are among the most difficult defects to test.

One way to detect process variation delay defects is through statistical testing, which relies on parameterized statistical timing information provided by a statistical timing analysis engine. However, many chips are designed using deterministic timing. In this case, the correctness of the chip design is verified using static timing analysis of the chip at several process corners. The deterministic timing data used here is not provided in a format that is compatible with more advanced statistical testing methodologies. Therefore, the existing deterministic design and test methodologies cannot use statistical testing methods for detecting process variation defects.

SUMMARY OF THE INVENTION

In one embodiment, the invention is a method and apparatus for enabling statistical testing using deterministic multi-corner timing analysis. One embodiment of a method for obtaining statistical timing data for an integrated circuit chip includes obtaining deterministic multi-corner timing data for the integrated circuit chip and constructing the statistical timing data from the deterministic multi-corner timing data.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In one embodiment, the present invention is a method and apparatus for enabling statistical testing using deterministic multi-corner timing analysis. Embodiments of the invention leverage existing multi-corner timing analysis results to reconstruct accurate and consistent parameterized statistical timing information. The reconstruction of the parameterized statistical timing information may be performed in different ways depending on how the multi-corner timing analysis results are obtained. In some embodiments, the solutions are formulated as very small scale optimization problems that can be efficiently solved. Deterministic multi-corner timing analysis techniques can advantageously utilize the results in order to benefit from the advanced capabilities offered by statistical testing.

Figure 1:
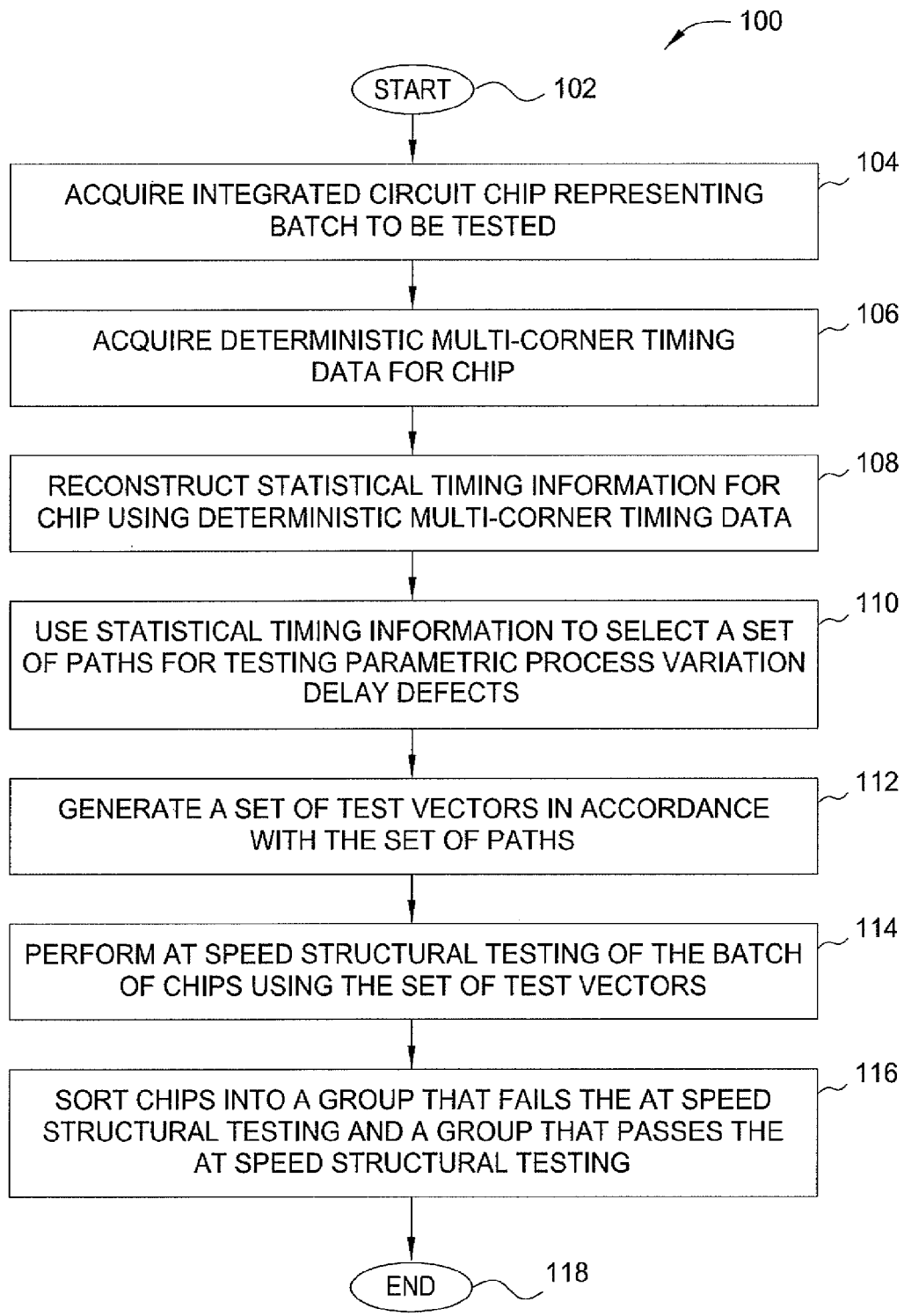
FIG. 1 is a flow diagram illustrating one embodiment of a method for testing a batch of integrated circuit chips, according to the present invention.

FIG. 1 is a flow diagram illustrating one embodiment of a method 100 for testing a batch of IC chips, according to the present invention. Specifically, the goal of the method 100 is to identify the chips in the batch that are "good" (i.e., pass timing requirements, which may be customer specified requirements) and the chips in the batch that are "bad" (i.e., fail timing requirements).

The method 100 is initialized at step 102 and proceeds to step 104, where a circuit representing the batch of chips to be tested is acquired. In step 106, deterministic multi-corner timing data is acquired for the IC chip. The deterministic timing information comprises timing information at multiple process corners for the IC chip. In particular, each process corner represents a combination of specific process parameters (e.g., metal thickness, wire width, transistor threshold voltage, transistor channel length, or the like) at particular values.

In step 108, statistical timing information is reconstructed for the IC chip using the deterministic multi-corner timing data. The result of the statistical timing analysis is a set of statistical timing information including, but not limited to, arrival times, required arrival times, and slacks. One embodiment of a method for statistical timing analysis using deterministic multi-corner timing information is discussed in more detail with respect to FIG. 2.

In step 110, the statistical timing information is used to select a set of paths for testing the batch of IC chips. Specifically, the set of paths is selected to test the IC chips for parametric process variation delay defects.

In step 112, a set of test vectors is generated in accordance with the set of paths selected in step 110. In one embodiment, the set of test vectors is generated using an automatic test pattern generation (ATPG) tool that takes the set of paths as an input.

In step 114, at speed structural testing (ASST) is performed for the batch of IC chips using the set of test vectors. Each of the IC chips will either pass ASST or fail ASST.

In step 116, the batch of IC chips is sorted into two groups: (1) a group that passes ASST; and (2) a group that fails ASST. The IC chips that pass ASST are considered "good" and are typically put into circulation, while the chips that fail ASST are considered "bad" and are typically withheld from circulation.

The method 100 then terminates in step 118.

As discussed above, a goal of the present invention is to enable statistical testing using deterministic multi-corner timing analysis. The timing results according to deterministic multi-corner timing analysis are numbers, rather than the distributions that are produced by statistical timing analysis.

Thus, one must use the deterministic timing information to reconstruct the parameterized statistical timing information that is required by statistical testing.

Figure 2:
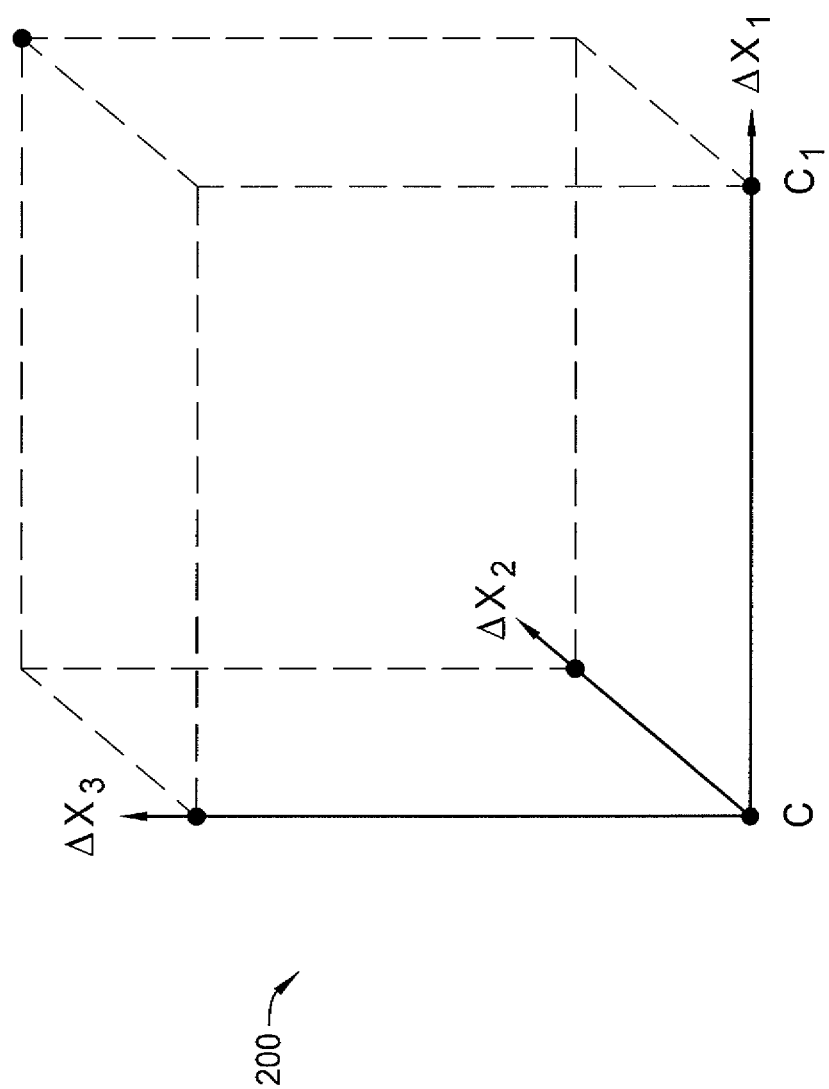
FIG. 2 is a graphical representation of a portion of the process variation space for an exemplary integrated circuit chip.

FIG. 2 is a graphical representation of a portion of the process variation space 200 for an exemplary IC chip. As illustrated, the process variation space 200 is represented as a box (parallelepiped). Each edge of the box represents a range of values for one of three particular process parameters $X_1$-$X_3$ (hereinafter collectively referred to as process parameters X), such as metal thickness, wire width, transistor threshold voltage, transistor channel length, or the like. Thus, each process parameter X provides two corners of the box, where each of the two corners represents an extreme value (e.g., minimum or maximum) for the corresponding process parameter X. It is understood that the proposed methods can be applied to any number of process parameters, however.

More specifically, three edges representing three process parameters X meet at each corner. Thus, each combination of the extreme values of the process parameters X has $2^3=8$ possibilities (yielding the eight corners of the box). As mentioned above, however, FIG. 2 illustrates only a portion of the process variation space. Thus, in reality, $2^n$ corners for n process parameters are possible.

Figure 3:
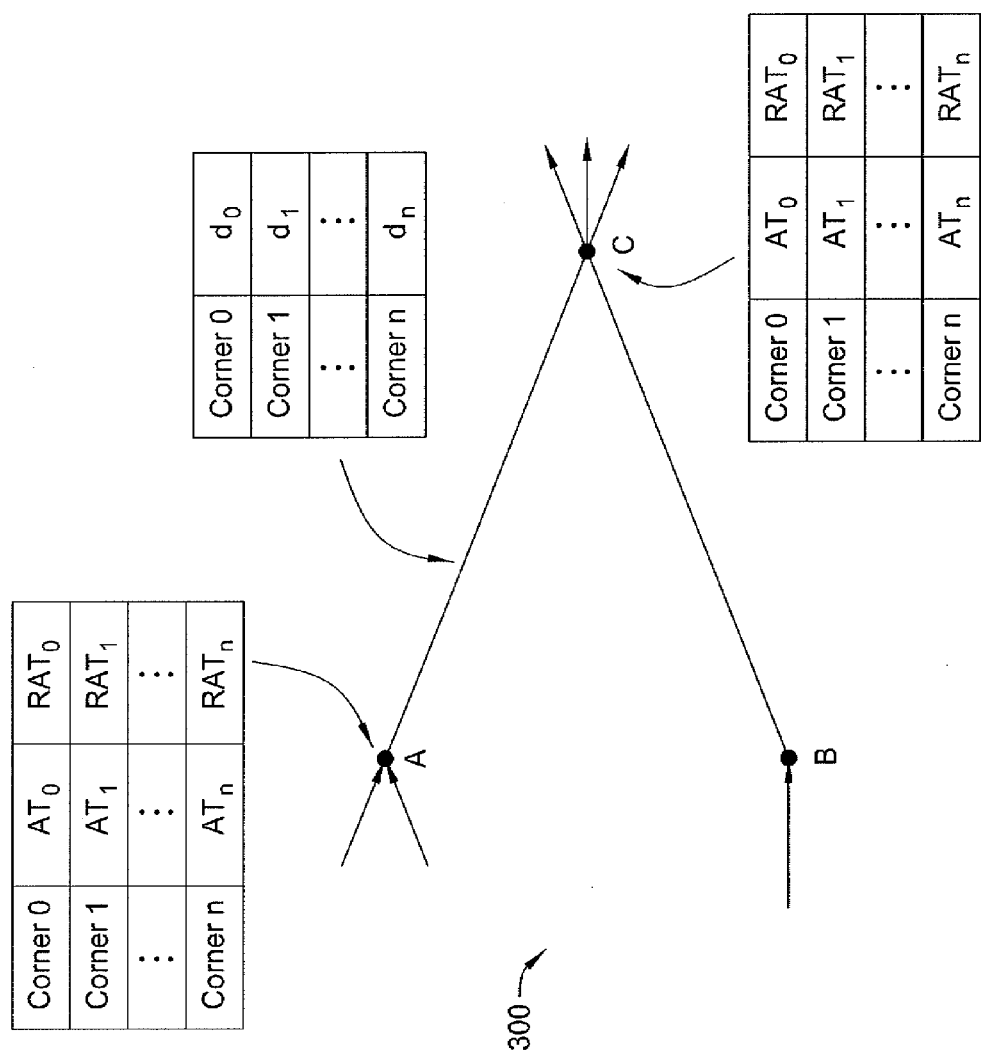
FIG. 3 is a schematic diagram illustrating a portion of an exemplary timing graph for an integrated circuit chip.

FIG. 3 is a schematic diagram illustrating a portion of an exemplary timing graph 300 for an IC chip. The exemplary timing graph includes a plurality of nodes (designated by the letters a-c), which represent the inputs, outputs, and internal nodes of the corresponding IC chip. The nodes are connected to each other by timing edges, which represent signal propagation paths between gates or wires. Those skilled in the art will recognize that FIG. 3 illustrates only one way of modeling a timing graph.

FIG. 3 additionally provides in tabular form, for the nodes a and c, a portion of the timing information for n+1 process corners (i.e., Corner 0-Corner n) at these nodes. Specifically, FIG. 3 provides the arrival times ($AT_0$-$AT_n$) and required arrival times ($RAT_0$-$RAT_n$). The delay ($d_0$-$d_n$) between nodes a and c is also provided for each of the n+1 corners. Thus, each node in the timing graph 300 has a corresponding table that provides timing data at each corner of the process variation space. This timing data is deterministic and can be obtained by running deterministic multi-corner timing analysis at n+1 corners of the process variation space as illustrated in FIG. 2.

Figure 4:
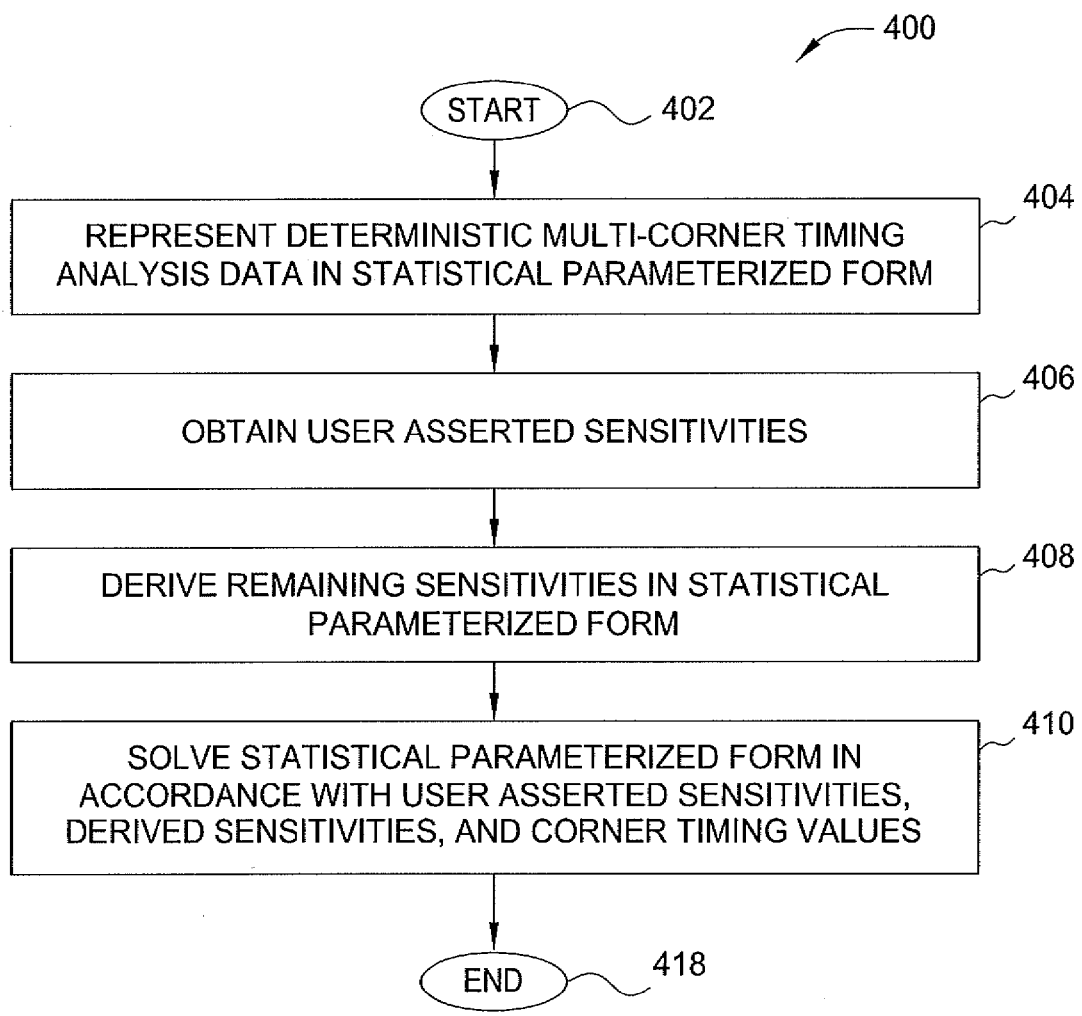
FIG. 4 is a flow diagram illustrating one embodiment of a method for reconstructing parameterized statistical timing information from deterministic multi-corner timing analysis data, according to the present invention.

FIG. 4 is a flow diagram illustrating one embodiment of a method 400 for reconstructing parameterized statistical timing information from deterministic multi-corner timing analysis data, according to the present invention. The method 400 may be implemented, for example, in accordance with step 208 of the method 200, described above.

The method 400 is initialized at step 402 and proceeds to step 404, where the acquired deterministic multi-corner timing analysis data is represented in statistical parameterized form. In one embodiment, the statistical parameterized form of the multi-corner timing data may be written as:

$$a_0+a_1\Delta X_1+a_2\Delta X_2+\ldots+a_n\Delta X_n+a_{n+1}\Delta R_a \quad \text{(EQN. 1)}$$

where $a_1$-$a_n$ are sensitivities of the timing quantity (e.g., arrival time, required arrival time, delay, or timing slack) to corresponding process parameters $X_1$-$X_n$ (i.e., how sensitive the timing quantity is to changes in the corresponding process parameter X), $a_0$ is a constant nominal value (e.g., the mean value of the timing quantity), and $R_a$ is an independently random uncertainty (or uncorrelated random source of variation/uncorrelated sensitivity).

A given statistical parameterized form as shown in EQN. 1 represents a random variable following a certain statistical distribution, and the given statistical parameterized form may take different values with different probabilities. The probability of the given statistical parameterized form taking a value smaller than a specific value can be computed based on its statistical distribution characteristics. Such a specific value is also called the "projected value" for the distribution with that particular probability. For a Gaussian distribution, for example, some typical projected values of interest include the mean value (i.e., the random variable would have a fifty percent probability of being smaller than the mean value) and the 3-sigma value (i.e., the random variable would have 99.87 percent probability of being smaller than the 3-sigma value).

In step 406, any user asserted sensitivities are obtained. The user asserted sensitivities are useful for taking into account timing variability due to process variation parameters that were not modeled in multi-corner deterministic timing In step 408, any sensitivities $a_1$-$a_n$ that are not user asserted are derived. In one embodiment, at least some of the sensitivities are derived from finite differencing of the deterministic multi-corner timing analysis data for the appropriate process corners. For instance, referring back to FIG. 2, the sensitivity of the process parameter $X_1$ can be obtained by finite differencing between the extreme values for $X_1$ (i.e., the values at the process corners c and $c_1$). If the arrival time (or other timing quantity) at one process corner is known, and then the arrival time (or other timing quantity) at the opposite process corner is also known, the difference between the arrival times (or other timing quantities) is due to the difference in the process parameter $X_1$ (i.e., due to $\Delta X_1$).

In another embodiment, at least some of the sensitivities are user asserted. For instance, a user may assert that an arrival time sensitivity to the independently random uncertainty $R_a$ is x percent of the mean (nominal) value of the arrival time.

Given a number L of corner timing information values and a number K of user asserted sensitivities for a number N of process parameters, there are multiple ways in which one can derive a set of consistent sensitivities for all timing quantities. Within the context of the present invention, a set of sensitivities is considered to be "consistent" if the resultant parameterized values of the timing quantities projected to the process corners are approximately equivalent to the deterministic timing quantities obtained by deterministic multi-corner timing analysis. For instance, there are multiple ways in which one can perform finite differencing, as discussed in greater detail below. However, it is important to verify that the projected timing from the reconstructed statistical timing information is consistent with the analyzed corners. That is, if values at the corners are substituted for the $\Delta X$ variables in EQN. 1, the resulting distribution should be consistent with what was timed at the corners. Moreover, the resulting distribution should be consistent with any user asserted sensitivities.

The statistical parameterized solution will depend on how the multi-corner timing runs are defined at various parameter settings. For instance, some solutions may be exact, while other solutions may be approximated. Moreover, some solutions may be suitable for linear parameterized form, while other solutions may be better suited for nonlinear parameterized form.

In step 410, the statistical parameterized form (as represented in EQN. 1) is solved in accordance with the derived sensitivities, the user asserted sensitivities (if any), and the corner timing values. In one embodiment, values at the corners are substituted for the corresponding $\Delta X$ variables in EQN. 1, while the derived and user asserted sensitivities are substituted for the corresponding sensitivity variables in EQN. 1. As discussed above, the resulting distribution should be consistent with what was timed at the corners and with any user asserted sensitivities.

The method 400 terminates in step 412.

As discussed above, the statistical parameterized solution will depend on how the multi-corner timing runs are defined at various parameter settings. In one embodiment, some special multi-corner timing circumstances can provide an exact solution. For instance, in one exemplary embodiment, N+1 corner timing data values are given, with each individual processing parameter X having a different value at a base corner (e.g., corner c of FIG. 2). In this case, the correlated sensitivity of the arrival time $a_i$ to changes in the processing parameter $X_i$ is expressed as $$a_i = \frac{d_i - d_0}{\partial X_i},$$

where $d_i$-$d_0$ is the change in arrival time ($\Delta d$).

Additionally, the uncorrelated sensitivity $a_r$ is expressed via user assertion, for example as 0.05*. The mean value of $a_0$ can be obtained by matching the known deterministic timing value $d_0$ obtained at the base corner as $$d_0 = a_0 + \sum_{i=1}^{n} a_i X_{0,i} + (0.05)(a_0 \|\Delta X_d\|),$$

where $X_{0,i}$ are extreme values that jointly 1=1 determine the base process corner, and $\Delta X_d$ can be chosen as a value of three for the typical three-sigma variation of the independent random variation. This yields a linear canonical form of the statistical parameterized solution as:

$$D = a_0 + \sum_{i=1}^{n} a_0 \Delta X_i + a_r \Delta X_d \quad \text{(EQN. 3)}$$

where $$a_r = 0.05 * a_0.$$

In another embodiment, a regression-based approach can yield a linear or nonlinear canonical form of the statistical parameterized solution. For instance, in one exemplary embodiment, N+1 corner timing data values are given, with each individual processing parameter X having at least two different values. Since each parameter has been changed at least once, the sensitivities of the arrival times to changes in the parameters are known. In this case, a linear parameterized form of the statistical parameterized solution can be obtained through regression by equating the uncorrelated sensitivity to the regression error. This can be expressed as:

$$(d_0, \ldots, d_i, \ldots) \Rightarrow D = a_0 + \sum_{i=1}^{n} a_0 \Delta X_i + a_r \Delta X_d \quad \text{(EQN. 4)}$$

A nonlinear parameterized form of the statistical parameterized solution can also be obtained through regression by equating the uncorrelated sensitivity to the regression error. For example, a bilinear parameterized form can be expressed as:

$$(d_0, \ldots, d_i, \ldots) \Rightarrow D = f(\Delta X_1, \ldots, \Delta X_i, \ldots) = \quad \text{(EQN. 5)}$$
$$a_0 + \sum_{i=1}^{n} a_0 \Delta X_i + \sum_{j=1}^{n} \sum_{i=1}^{n} a_{i,j} \Delta X_i \Delta X_j + a_r \Delta X_d$$

In yet another embodiment, the statistical parameterized solution can be formed as an optimization problem. In one particular embodiment, the weighted total deviation from the user asserted sensitivities and the corner timing values is minimized according to:

$$\min_{a_0, \ldots, a_n, A_{n+1}} w_{assertion} \sum_{\forall k = asserted} \|a_k - a_{asserted,k}\| + \quad \text{(EQN. 6)}$$
$$w_{corner} \sum_{i=1,\ldots,L} \|A_{prj,i} - T_{mcorner,i}\|$$

where $a_k$ are the unknown sensitivities, $a_{asserted,k}$ are the known user asserted sensitivities, $A_{prj,i}$ are the projected timing quantities at the $i^{th}$ process corner, and $T_{mcorner,i}$ are the timing quantities obtained from the deterministic timing analysis performed at the $i^{th}$ process corner. The differences between the unknown sensitivities and user asserted sensitivities are measured by some mathematical norm (such as the 2-norm) represented by $\|.\|$; the same description applies to the differences between the projected timing quantities and the timing quantities obtained from deterministic timing analysis. $W_{assertion}$ and $w_{corner}$ are weighting coefficients that can be user-specified.

In another embodiment, the total deviation from the multi-corner timing values with all non-user asserted sensitivities is minimized according to:

$$\min_{\forall a_k = nonasserted} \sum_{\forall i} \|A_{prj,i} - T_{mcorner,i}\| \quad \text{(EQN. 7)}$$

Both EQN. 6 and EQN. 7 are small optimization problems that can be solved efficiently, since the number of unknowns is small.

The disclosed techniques allow one to construct parameterized statistical timing information that is consistent with available multi-corner timing results from a deterministic static timing analysis. In particular, one can obtain all timing quantities (e.g., arrival times, required arrival times, slacks, and the like) in both late and early models and in parameterized form. The ability to reconstruct the parameterized statistical timing information allows one to utilize statistical testing methodologies, statistical optimization, statistical synthesis, and parametric yield analysis for designs that use conventional multi-corner deterministic timing. The use of more advanced statistical testing methodologies results in improved design quality (e.g., in terms of testing, robustness, and the like).

Figure 5:
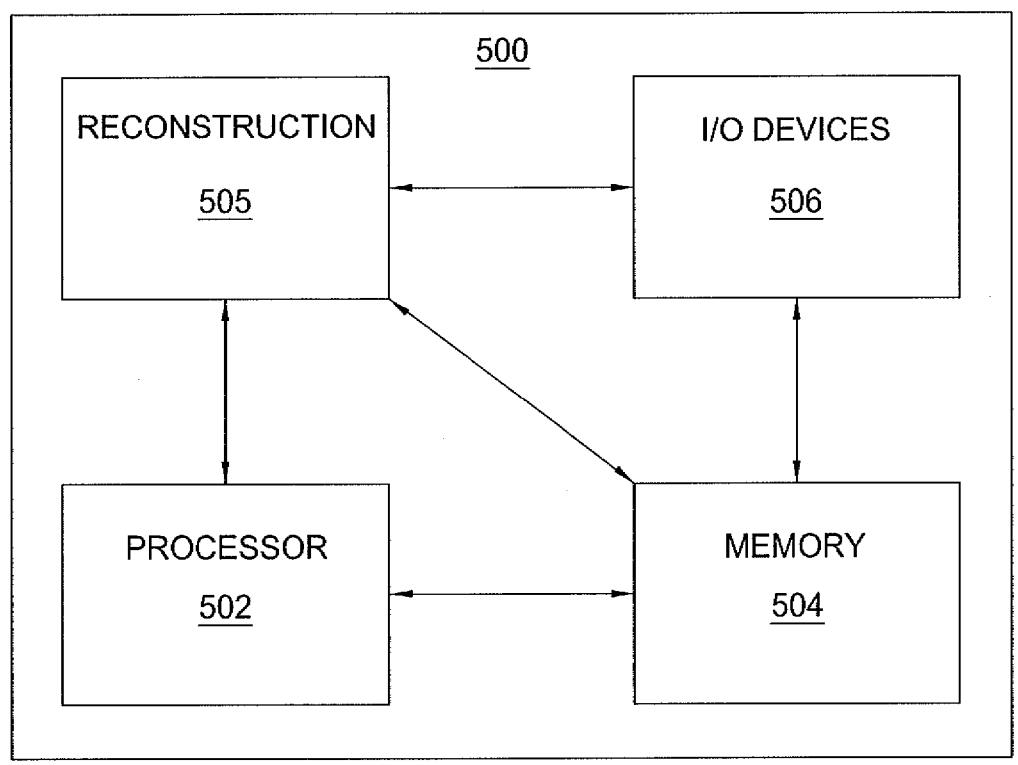
FIG. 5 is a high-level block diagram of the parameterized statistical timing information reconstruction method that is implemented using a general purpose computing device.

FIG. 5 is a high-level block diagram of the parameterized statistical timing information reconstruction method that is implemented using a general purpose computing device 500. In one embodiment, a general purpose computing device 500 comprises a processor 502, a memory 504, a reconstruction module 505 and various input/output (I/O) devices 506 such as a display, a keyboard, a mouse, a stylus, a wireless network access card, and the like. In one embodiment, at least one I/O device is a storage device (e.g., a disk drive, an optical disk drive, a floppy disk drive, a path selection tool, and/or a test pattern generation tool). It should be understood that the reconstruction module 505 can be implemented as a physical device or subsystem that is coupled to a processor through a communication channel.

Alternatively, the reconstruction module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the reconstruction module 505 for reconstructing parameterized statistical timing information from deterministic multi-corner timing analysis data, as described herein with reference to the preceding Figures, can be stored on a computer readable storage device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the figures, and as such these terms may be interchangeable.

What is claimed is:

1. A method for obtaining statistical timing data for an integrated circuit chip, the method comprising:
    obtaining deterministic multi-corner timing data for the integrated circuit chip; and
    constructing the statistical timing data, wherein the constructing comprises:
    representing the deterministic multi-corner timing data in a parameterized form, wherein the parameterized form depends on one or more process parameters associated with fabrication of the integrated circuit chip and on sensitivities of timing quantities associated with the integrated circuit chip to a change in the one or more process parameters, and wherein at least some of the sensitivities are derived using finite differencing of the deterministic multi-corner timing data associated with two corners of a process variation space associated with the integrated circuit chip; and
    deriving the statistical timing data from a solution to the parameterized form from the deterministic multi-corner timing data,
    wherein the constructing is performed by a processor.

2. The method of claim 1, wherein the parameterized form further depends on an independently random uncertainty.

3. The method of claim 1, wherein at least some of the sensitivities are user asserted.

4. The method of claim 1, wherein the deriving comprises:
    correlating the sensitivities to yield a linear canonical form of the statistical timing data.

5. The method of claim 1, wherein the deriving comprises:
    equating the sensitivities to a regression error of a regression-based solution, where the sensitivities are uncorrelated.

6. The method of claim 1, wherein the deriving comprises:
    equating the sensitivities to a regression error of the solution, wherein the solution is regression-based and the sensitivities are uncorrelated.

7. The method of claim 1, wherein the deriving comprises:
    formulating the solution as an optimization problem.

8. The method of claim 7, wherein the formulating comprises:
    minimizing a weighted total deviation from the sensitivities and from a timing value associated with at least one of the one or more process parameters.

9. The method of claim 7, wherein the formulating comprises:
    minimizing a total deviation from the sensitivities and from a timing value associated with at least one of the one or more process parameters, wherein the sensitivities are user asserted.

10. The method of claim 1, wherein the deterministic multi-corner timing data comprises timing values associated with the one or more process parameters, and the statistical timing data comprises timing distributions associated with a process variation space containing the one or more process parameters.

11. The method of claim 1, further comprising:
    processing the integrated circuit chip in accordance with a statistical technique, using the parameterized statistical timing data.

12. The method of claim 11, wherein the statistical technique is a statistical testing technique.

13. The method of claim 11, wherein the statistical technique is a statistical optimization technique.

14. The method of claim 11, wherein the statistical technique is a statistical synthesis technique.

15. The method of claim 11, wherein the statistical technique is a parametric yield analysis.

16. A computer readable storage device containing an executable program for obtaining statistical timing data for an integrated circuit chip, where the program performs steps of:
    obtaining deterministic multi-corner timing data for the integrated circuit chip; and
    constructing the statistical timing data from the deterministic multi-corner timing data, wherein the constructing comprises:
    representing the deterministic multi-corner timing data in a parameterized form, wherein the parameterized form depends on one or more process parameters associated with fabrication of the integrated circuit chip and on sensitivities of timing quantities associated with the integrated circuit chip to a change in the one or more process parameters, and wherein at least some of the sensitivities are derived using finite differencing of the deterministic multi-corner timing data associated with two corners of a process variation space associated with the integrated circuit chip; and
    deriving the statistical timing data from a solution to the parameterized form.

17. Apparatus for obtaining statistical timing data for an integrated circuit chip, the apparatus comprising:
a processor configured to:
obtain deterministic multi-corner timing data for the integrated circuit chip; and
construct the statistical timing data from the deterministic multi-corner timing data the deterministic multi-corner timing data in a parameterized form, wherein the parameterized form depends on one or more process parameters associated with fabrication of the integrated circuit chip and on sensitivities of timing quantities associated with the integrated circuit chip to a change in the one or more process parameters, and wherein at least some of the sensitivities are derived using finite differencing of the deterministic multi-corner timing data associated with two corners of a process variation space associated with the integrated circuit chip; and
deriving the statistical timing data from a solution to the parameterized form.

* * * * *